United States Patent [19]

Johnson

[11] 4,165,358

[45] Aug. 21, 1979

[54] PROCESS FOR CLAMPING, SEALING, AND AIDING THE FILLING OF MATCHED MOLDS

[76] Inventor: Jay Johnson, 3225 N. Verdugo, Glendale, Calif. 91208

[21] Appl. No.: 895,639

[22] Filed: Apr. 12, 1978

[51] Int. Cl.² ................................................ B29F 1/00
[52] U.S. Cl. ................................ 264/571; 264/102; 264/328; 264/DIG. 78; 269/21; 425/451.9
[58] Field of Search ................ 264/90, 101, 102, 314, 264/316, 328, DIG. 78; 425/388, 389, 390, 405 R, 451.9, DIG. 60; 269/21

[56] References Cited

U.S. PATENT DOCUMENTS

| | | | |
|---|---|---|---|
| 1,909,444 | 5/1933 | Worrall | 264/DIG. 78 |
| 2,054,864 | 9/1936 | Owen | 269/21 |
| 2,331,296 | 10/1943 | Bendix | 264/90 X |
| 2,923,978 | 2/1960 | Corzine | 264/90 |
| 2,969,299 | 1/1961 | Fullerton | 269/21 X |
| 3,666,600 | 5/1972 | Yoshino | 264/90 X |
| 3,787,546 | 1/1974 | Prah | 264/DIG. 78 |

*Primary Examiner*—Thomas P. Pavelko
*Attorney, Agent, or Firm*—Keil & Witherspoon

[57] ABSTRACT

A technique and process for clamping, sealing and aiding in the filling of fiberglass or other types of matched low pressure molds. An air-impervious bag is placed about the male and female molds and is sealed. A vacuum is then produced within the bag in such a manner as to fix the molds firmly together while sealing the mold parting line and whereupon a predetermined amount of molding material is injected within the mold cavity.

6 Claims, 4 Drawing Figures

PROCESS FOR CLAMPING, SEALING, AND AIDING THE FILLING OF MATCHED MOLDS

INTRODUCTION

The present invention relates generally to a low pressure molding technique and, more particularly, to a method for clamping, sealing and aiding in filling of fiberglass or other types of matched molds.

BACKGROUND OF THE INVENTION

With conventional molding techniques, a common method for holding the male and female molds or dies together is to utilize a clamping device that is mechanical, pneumatic or hydraulic in its operation. These clamps are generally arranged about the edges of the molds so as to direct as even a pressure as possible to the clamping flanges. However, whenever such clamps fail due to a poor seal being made or uneven pressure being exerted about the parting surfaces of the molds, the material which is injected between the mold or dies will leak from that point thereby running on to the shop floor causing a mess and releasing sometimes dangerous fumes into the surrounding air.

Furthermore, with such conventional molding techniques, it is essential that a vent hole be provided at the apex of the mold or die. This vent hole must overflow with the injected material in order to eliminate air bubbles from being trapped in the mold cavity and thereby in the resulting injected part.

Furthermore, in the conventional method, an adequate seal of some type must be used to prevent leakage while the mold is being filled.

Although the use of vacuum in order to aid the molding process is known as is described in U.S. Pat. No. 2,913,036 and British Pat. No. 944,955, such techniques have not been utilized in standard two-piece molding processes, nor are they directly applicable to such processes.

BRIEF DESCRIPTION OF THE INVENTION

The present invention eliminates the need for the above-described clamping devices, vent holes, seals of any type, and the drawbacks associated with their use, by providing a plastic vacuum bag which encloses the entire male and female mold parts prior to injection of the molding material. A vacuum is applied to the plastic bag which produces inwardly directed pressure forces over the entire outer surface of the mold parts thereby causing the mold flanges to be very evenly clamped and sealed together. Further seal is provided by the bag itself as atmospheric pressure pushes the bag tightly against the mold's parting edges.

Since the mold cavity is also in a vacuum state due to the air being drawn from the surrounding plastic bag, it will accept the injected molding material without difficulty and fill all voids therein more effectively and at a lower pressure than required with prior injection techniques. In addition, since the inexpensive plastic bag of the present invention completely surrounds the molding parts, no fumes or injected liquid is permitted to escape therefrom into the shop area. Furthermore, the present invention allows the molds to be opened quickly after the molding material has cured or hardened without the bothersome and time-consuming chore of disengaging the mechanical clamping devices of the prior molding devices. Even further, the aforesaid sealing effect inherent in the present invention eliminates the time-consuming and costly replacement of seals.

DESCRIPTION OF THE PREFERRED EMBODIMENT

Figure 1:
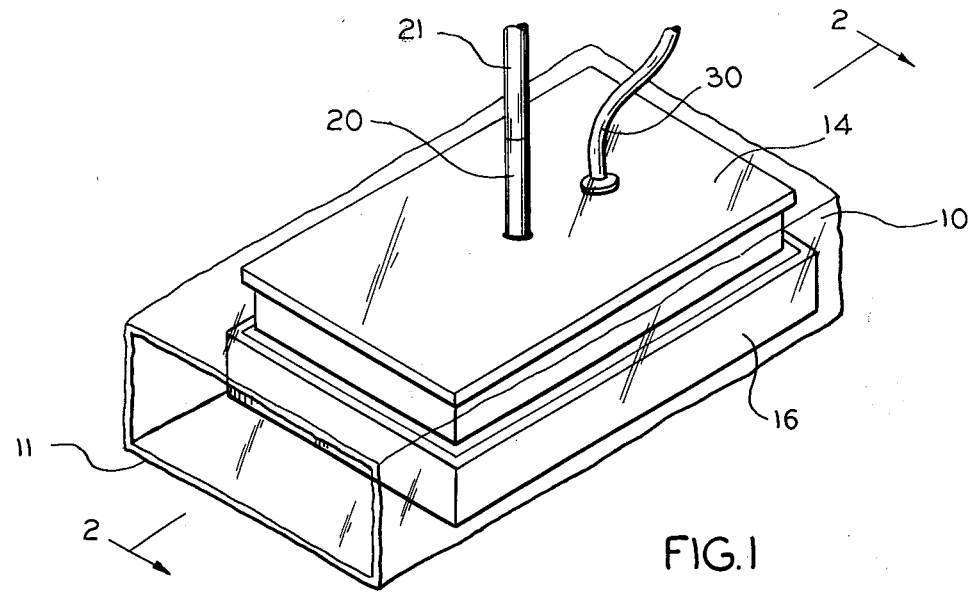
FIG. 1 is an exploded perspective view of the entire molding assembly with surrounding vacuum bag according to an embodiment of the present invention.
Figure 2:
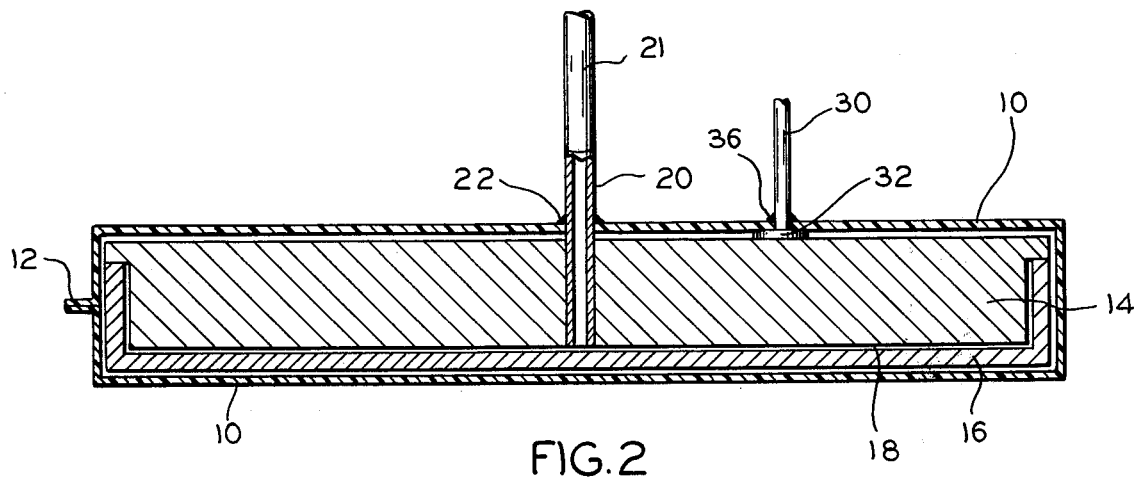
FIG. 2 is a cross-sectional side view taken along line 2—2 of FIG. 1 showing the molding assembly and surrounding vacuum bag in an operational condition prior to the injection of the molding material and the applying of the vacuum.

FIGS. 1 and 2 illustrate an embodiment of the molding technique of the present invention wherein an air-impervious bag 10, preferably made of an inexpensive plastic material such as polyethylene having an approximately 4–10 mil thickness, is placed about male 14 and female 16 molds or dies which, when assembled (as shown in FIG. 2) create a cavity 18 corresponding to the shape of the item to be molded.

After bag 10 is placed about the mold parts 14, 16, its open end 11 is sealed in an appropriate well-known manner (such as by heat sealing or the like) forming a bead 12 along that end of the mold assembly. In this manner, the bag surrounds and is sealed about the molding parts on all sides.

Although a simple single cavity, two piece, low pressure injection-type mold is shown in the drawings, it is to be understood that any low pressure type of mold which must be clamped together during the molding operation may be utilized with the present invention.

Figure 3:
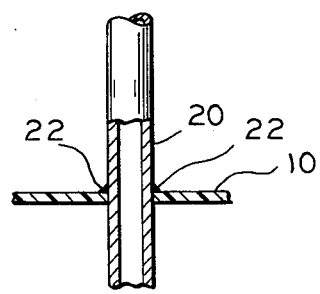
FIG. 3 is an enlarged view of a portion of the molding assembly shown in FIGS. 1 and 2.

Male mold part 14 has a pipe-like opening 20 extending therefrom which opens into the mold cavity 18 into which the molding material which forms the desired molded item is injected. The injected material may be a catalyzed resin or other similar type thermosetting material. As is best shown in FIG. 3, pipe 20 extends through an opening formed in bag 10 and is sealed at this protrusion point with an appropriate gum or adhesive material 22 in order to avoid any air leaks into the bag. A hose 21 is attached to pipe 20 which connects it to the injection machine (not shown).

Figure 4:
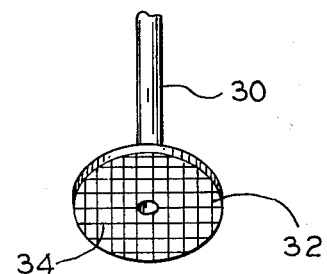
FIG. 4 is an enlarged view of another portion of the molding assembly shown in FIGS. 1 and 2.

An additional opening is formed in bag 10 to accept tubing 30 which connects the bag to a vacuum source (not shown). As is best illustrated in FIG. 4, tubing 30 has a flange 32 formed at its end which prevents bag 10 from being sucked into it as the air is drawn from the mold assembly. Flange 32 has grooves 34 formed in its end surface to permit the air to be easily drawn therefrom. As with resin supply pipe 20, tubing 30 is sealed at its protrusion point from the bag with an appropriate material 36 in order to prevent any air leaks into the bag.

In operation, the bag is sealed about the assembled mold parts and a vacuum is applied to tubing 30. When this vacuum has reached approximately 25–28 inches of Hg, the molding resin is injected into supply pipe 20. Either a predetermined amount of resin may be injected into mold cavity 18 or the cavity can be filled until the point where it is observed by the operator that the molding material is running from a vent hole (not shown) in the mold parts or from about the mold parting line. Since the mold cavity is also in a vacuum state, it will immediately accept the resinous molding material and all voids will be filled within the cavity at a lower injection pressure and without the necessity of venting holes or seals of any type.

Furthermore, the surrounding atmospheric pressure will produce a pressure of approximately 14.7 pounds /sq. in. uniformly over the entire surface of the male and female mold parts thereby producing an excellent seal therebetween without the necessity of clamping flanges. Even if the surface of the molds normal sealing areas are rough or uneven, that is to say, unable to seal themselves even with the pressure exerted, the plastic bag will produce an adequate seal and prevent material loss. From the foregoing it will be seen that, inasmuch as the plastic bag completely surrounds the molding parts the bag, upon the vacuum being produced therein, forms a seal at the mold parting surfaces, provides a chamber to retain material overflow and retains unwanted fumes from escaping into the work area. In addition, due to the flexible design of the vacuum bag, it may be utilized with existing molds of standard design even though complex in shape.

After the mold cavity is filled, a clamping device is applied to the resin inlet hose and the vacuum source is continued to be applied until the molding material is cured. At that time the vacuum source is disconnected and the vacuum bag will return to its original shape in which it is easily removed from the mold parts. The mold is then quickly and easily opened and the molded item is removed from therein.

While a particular embodiment of the present invention has been shown and described in detail, it should be understood that various changes and modifications thereto may be made, and it is therefore intended in the following claims to include all such modifications and changes as may fall within the spirit and scope of this invention.

What is claimed is:

1. A method of clamping, sealing, and aiding the filling of low pressure matched molds, said method comprising the steps of:
    placing an air-impervious bag about the matched mold parts;
    sealing said bag about said molds;
    producing a vacuum within said bag in a manner such as to fix said molds firmly together; and
    injecting a predetermined amount of molding material within said molds.

2. The method of claim 1 further comprising the step of producing a vacuum within said mold cavity prior to injecting said molding material therein.

3. The method of claim 1 wherein said step of producing a vacuum within said bag placed about the matched mold parts includes producing, by means of said bag, a seal at the mold parting surfaces.

4. The method of claim 1 wherein said step of producing a vacuum within said bag placed about the matched mold parts includes providing, by means of said bag, a chamber to retain material overflow.

5. The method of claims 1 or 4 wherein said step of producing a vacuum within said bag placed about the matched mold parts includes retaining unwanted fumes from escaping into the work area.

6. The method of claim 1 further comprising the steps of:
    curing said molding material within said molds;
    returning said bag to normal atmospheric pressure; and
    removing said bag from about said molds and separating said parts to remove the hardened molding material from therein.

* * * * *